March 7, 1967
F. COWAN
3,307,608
FLAME-MONITORING SYSTEM
Filed Oct. 5, 1965
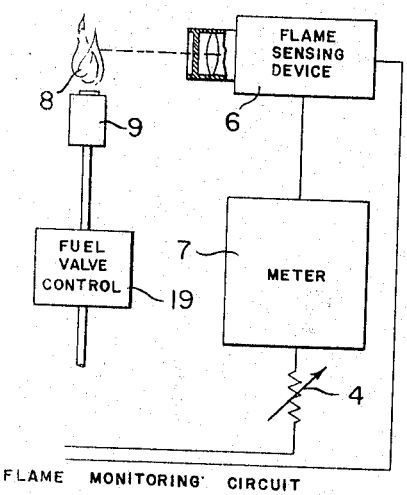
Fig. I
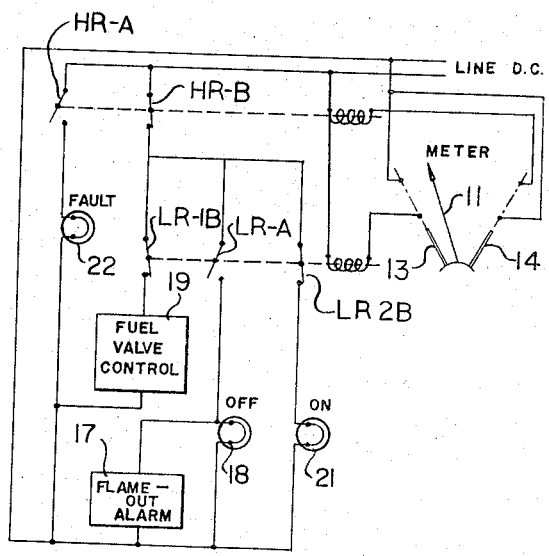
Fig. II
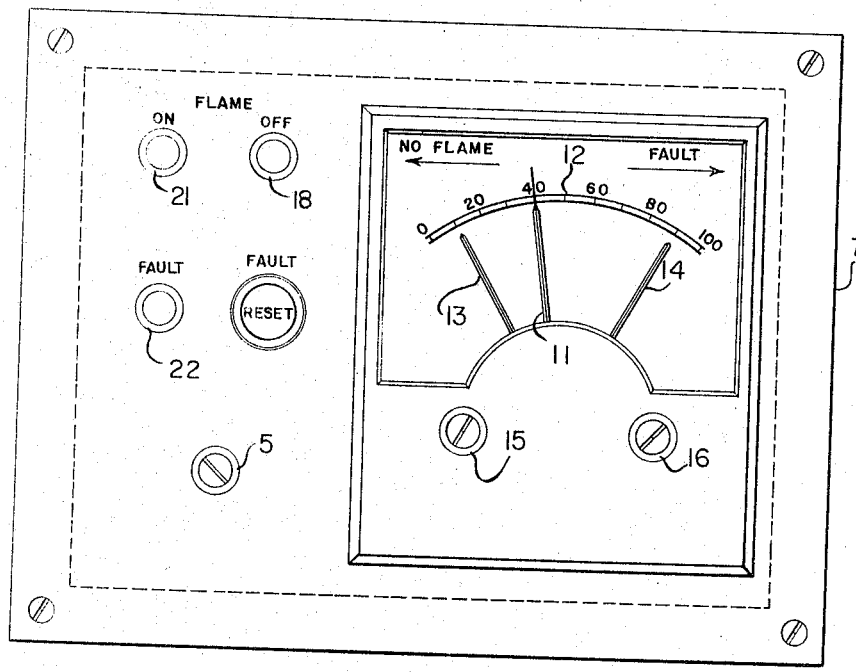
Fig. III
INVENTOR.
FREDERICK COWAN
BY
Charles E. Baxley
ATTORNEY स
United States Patent Office 3,307,608
Patented Mar. 7, 1967

3,307,608
FLAME-MONITORING SYSTEM
Frederick Cowan, 32 Woodvale Drive,
Syosset, N.Y. 11791
Filed Oct. 5, 1965, Ser. No. 493,181
3 Claims. (Cl. 158—28)

This disclosure relates to flame-monitoring systems wherein, on the loss of flame, safety measures are taken. The invention resides in such a system which not only acts on the loss of flame but which also signals a fault in the monitoring circuit. Accordingly this invention offers added reliability over prior systems.

In essence, any flame-monitoring system includes a sensor (which can be a photocell, a thermocouple, sound receiver or some like device which is sensitive to heat, radiation or some other characteristic of the flame) and an actor which goes into play in response to a change of the sensor. A sensor of the type here contemplated monitors flame and relates its sensation to an easily measured quantity such as an electrical resistance. The actor responds to this resistance and on a signal from the sensor that the monitored flame is out (a drop in the measured quantity) the actor trips out the fuel supply, energizes a flame-out lamp and sounds an alarm.

The reliability of such a flame-monitoring system is dependent upon the sensing device's ability to drop its measured quantity on the occurrence of a flame-out. It has been found that various defects in sensing devices (such as the wearing out of a photocell) cause the measured quantities keyed to these devices to inordinately increase. While defective sensing devices were actually inoperable and unable to detect a flame-out, the drop in measured quantity necessary to bring the actor into play could not be accomplished. Worse than this—when a sensing device was defective, there was no convenient way for plant operators to know of this situation.

The present invention detects and announces a high-measured-quantity defect in a sensing device. A high switch is operatively associated with the sensing device to actuate a fault signal.

The foregoing and other features will appear more fully from the accompanying drawings wherein:

FIGURE I is a schematic arrangement showing the relationship of the flame-sensing device and the monitor.

FIGURE II shows the basic circuitry of the meter panel.

FIGURE III illustrates the physical arrangement of the meter and its appurtenances.

In the shown embodiment the measured quantity which brings the actor into play is electrical resistance, but it is fully contemplated that some other measured quantity such as (for example) voltage or amperage could also serve the same purpose. As seen in FIGURES I and III, variable resistor 4 controlled by sensitivity knob 5 is in series with flame-sensing device 6 and meter 7. Flame-sensing device 6 relates the intensity of flame 8 (emitted by burner 9) to an electrical resistance. When a photoelectric, flame-sensing device is employed, this system may be operated with all types of photocells having wavelengths from 1800 Angstroms to infrared radiation (over 7000 Angstroms). It should also be understood that this advance is applicable to both alternating and direct-current circuits.

Meter 7 includes indicator 11 which is arranged to move along scale 12 in response to the resistance level of sensing device 6.

Two limit switches are marked by low-resistance-level flag 13 and by high-resistance-level flag 14. Both of these limit switches are adjustable. To set up the meter, low-resistance-level flag 13 and high-resistance-level flag 14 are both positioned at the extremities of scale 12. Indicator 11 is then set at about 60% of scale 12. The low-resistance switch is manually set by means of adjustment knob 15 (associated with a first trim pot) at about the 20% mark. The high-resistance switch is manually set by means of adjustment knob 16 (associated with a second trim pot) about the 90% mark of scale 12.

When no flame is seen by sensing device 6, indicator 11 moves counterclockwise whereby normally open, low-resistance switch LR–A is closed and whereby first and second, normally closed, low-resistance switches LR–1B and LR–2B are opened. The closing of normally open, low-resistance switch LR–A sounds flame-out alarm 17. Closing normally open, low-resistance switch LR–A also lights flame-off lamp 18. Opening first, normally closed switch LR–1B permits fuel valve 19 to be closed by a biassing means (not shown) thereby shutting down fuel to burner 9. Opening normally closed switch LR–2B extinguishes flame-on lamp 21.

When a high-resistance fault develops in sensing device 6, indicator 11 moves clockwise whereby normally open, high-resistance switch HR–A is closed to light fault lamp 22 and normally closed, high-resistance switch HR–B is opened to extinguish flame-on lamp 21.

It will be understood by those skilled in flame monitoring that wide deviation may be made from that shown without departing from the main theme of invention set forth in the following claims.

What is claimed is:

1. In combination, a flame producing burner, a monitoring system for the flame of said burner and comprising a flame sensing device and a meter connected in series across an electrical circuit,
   the sensing device operatively associated with the monitored flame to relate flame intensity to an electrical resistance,
   the meter having an indicator which is arranged to move in response to the resistance of the sensing device,
   a fuel valve operatively connected to the burner,
   closure means normally tending to close the fuel valve,
   the meter including a first normally closed low-resistance switch operatively connected to the fuel valve and arranged to open on the movement of the indicator below a predetermined low-resistance level so that the fuel valve is allowed to close thereby shutting the burner down,
   a flame-out alarm,
   the meter including a first normally open low-resistance switch operatively connected to the flame-out alarm and arranged to close on the movement of the indicator below the low-resistance level to energize the flame-out alarm,
   a flame-on lamp and a flame-out lamp,
   said first normally open low-resistance switch operatively connected to the flame-out lamp and arranged to close on the movement of the indicator below the low-resistance level to light the flame-out lamp,
   the meter including a normally open high-resistance switch operatively connected to a fault lamp and arranged to close on the movement of the indicator above a predetermined high-resistance level.

2. In combination, a flame producing burner, a monitoring system for the flame of said burner and comprising a flame sensing device and a meter connected in series across an electrical circuit, the sensing device operatively associated with the monitored flame to relate flame intensity to an electrical resistance, the meter having an indicator which is arranged to move in response to the resistance of the sensing device, a fuel valve operatively connected to the burner, closure means normally tending to close the fuel valve, the meter including a first normally closed low-resistance switch operatively connected to the fuel valve and arranged to open on the movement of the indicator below a predetermined low-resistance level so that the fuel valve is allowed to close thereby shutting the burner down.

3. In combination, a flame producing burner, a monitoring system for the flame of said burner and comprising a flame sensing device and a meter connected in series across an electrical circuit, the sensing device operatively associated with the monitored flame to relate flame intensity to an electrical resistance, the meter having an indicator which is arranged to move in response to the resistance of the sensing device, a fuel valve operatively connected to the burner, closure means normally tending to close the fuel valve, the meter including a first normally closed low-resistance switch operatively connected to the fuel valve and arranged to open on the movement of the indicator below a predetermined low-resistance level so that the fuel valve is allowed to close thereby shutting the burner down, a flame-out alarm, the meter including a first normally open low-resistance switch operatively connected to the flame-out alarm and arranged to close on the movement of the indicator below the low-resistance level to energize the flame-out alarm.

References Cited by the Examiner

UNITED STATES PATENTS

| | | | |
|---|---|---|---|
| 2,054,380 | 9/1936 | Lamb | 340—228 X |
| 2,365,601 | 12/1944 | Sipman | 340—228 |
| 2,593,204 | 4/1952 | Schwartzberg. | |
| 3,202,976 | 8/1965 | Rowell | 158—28 |

FOREIGN PATENTS 305,707   2/1929   Great Britain.

JAMES W. WESTHAVER, *Primary Examiner.*